United States Patent [19]

De Lorean et al.

[11] 3,815,703

[45] June 11, 1974

[54] AUTOMOTIVE VEHICLE

[75] Inventors: John Z. De Lorean, Bloomfield Hills; Brook A. Lindbert, Utica, both of Mich.

[73] Assignee: General Motors Corporation, Detroit, Mich.

[22] Filed: Dec. 14, 1972

[21] Appl. No.: 315,082

[52] U.S. Cl............. 180/91, 180/64 L, 280/150 AB, 293/2, 248/3
[51] Int. Cl.............................................. B60n 21/00
[58] Field of Search...... 280/150 AB; 180/82 R, 91, 180/94, 103, 64 R, 64 L, 64 M, 85; 293/1, 2; 248/3, 7

[56] References Cited
UNITED STATES PATENTS

| | | | |
|---|---|---|---|
| 2,628,118 | 2/1953 | Gunnels | 293/73 |
| 2,900,036 | 8/1959 | Blake | 180/82 R |
| 3,001,815 | 9/1961 | Weber | 293/1 |
| 3,347,501 | 10/1967 | Elmeren | 180/64 R |
| 3,525,413 | 8/1970 | Kripke | 180/64 R |
| 3,589,466 | 6/1971 | Dudley | 180/64 L |
| 3,638,748 | 2/1972 | Tixier | 293/63 |
| 3,672,697 | 6/1972 | Knowles | 180/82 R |
| 3,752,247 | 8/1973 | Schwenk | 180/91 |

*Primary Examiner*—David Schonberg
*Assistant Examiner*—John P. Silverstrim
*Attorney, Agent, or Firm*—Herbert Furman

[57] ABSTRACT

An automotive vehicle includes a frame structure including frame rails connected by cross frame members. An impact bar is supported on the forward portions of the frame rails by energy absorption struts of the type including a piston movable within a displaceable fluid medium contained in a cylinder to thereby absorb low level impact forces. A pair of rigid members extend from the impact bar through guides secured to one of the cross frame members. The engine of the vehicle power plant is secured to the rigid members to connect the engine to the impact bar for sliding movement relative to the frame. The transmission of the power plant is slidably mounted in a similar manner on another cross frame member so that the power plant and impact bar receive the impact forces as a unit and the struts absorb such forces up to their absorption limit. The frame rails may also include controlled deformation regions for absorption of higher level impact forces. The vehicle may also include a source of pressure fluid released to inflate an occupant restraint when the impact forces exceed the limit of absorption by the frame.

7 Claims, 4 Drawing Figures

AUTOMOTIVE VEHICLE

This invention relates generally to automotive vehicles and more particularly to an energy absorption arrangement for absorbing impact forces applied to the impact bar or bumper of the vehicle upon engagement thereof with an obstacle.

It is well known to mount an impact bar or bumper on the frame of a vehicle by energy absorbing struts. Such struts include a cylinder containing a displaceable fluid medium and a piston movable within the cylinder under impact force loads to displace the medium from one side of the piston to the other and thereby absorb the energy of the impact forces. Such struts have the capacity of absorbing only low level impact forces. When the forces reach higher levels, it is known to provide controlled deformation of the frame or alternatively to permit the frame to deform without any control. It is also known to inflate an inflatable occupant restraint when the impact forces exceed a level which can be absorbed by deformation of the frame.

In the energy absorption arrangement of this invention, the vehicle power plant mass is effectively removed from the mass of the vehicle and transferred to the mass of the impact bar upon engagement of the impact bar with an obstacle. This is accomplished in the preferred embodiment by securing the power plant to the impact bar to provide a high mass unit, and slidably mounting such unit on the frame. Preferably, rigid members extend from the impact bar and are slidably mounted on the frame. The power plant is secured to such rigid members as well as being otherwise slidably mounted to the frame of the vehicle. The impact bar is mounted to the vehicle by the energy absorbing struts which function to slidably mount the impact bar on the frame. Thus, the entire high mass unit is slidable relative to the frame under impact force loads, and such loads up to a set level are absorbed by energy absorbing struts between the unit and the frame. The vehicle power plant is effectively stopped upon initial contact of the impact bar with an obstacle and the mass thereof does not function with the mass of the vehicle upon such impact engagement.

If desired, the frame may be provided with controlled mechanically deformable areas for absorbing higher level impact forces which exceed the limit of absorption of the struts. Additionally, if desired, the vehicle may be provided with an inflatable occupant restraint which may be inflated when such higher level forces exceed the limit of absorption of the deformable portions of the frame.

One feature of this invention is that it provides an improved energy absorption arrangement for automotive vehicles wherein the vehicle power plant and a vehicle impact bar move as a unit relative to the vehicle frame under impact loading conditions and energy absorbing means are provided between the unit and the vehicle to absorb such impact forces. Another feature of this invention is that the energy absorbing means comprise energy absorbing struts mounting the impact bar on the vehicle, and the vehicle power plant is movably mounted on the vehicle and secured to the impact bar for simultaneous movement therewith. A further feature of this invention is that rigid members extend from the impact bar and are slidably guided within guides secured to the vehicle frame, with the vehicle power plant being movably mounted on the vehicle at least in part by being secured to such rigid members. Yet another feature of this invention is that the energy absorbing struts are secured to deformable portions of the vehicle frame for deformation thereof and absorption of higher level impact loads which exceed the limit of absorption capability of the strut. Yet a further feature of this invention is that higher level impact loads exceeding the limit of absorption capability of the frame provide a signal for inflation of an inflatable occupant restraint.

These and other features will be readily apparent from the following specification and drawings wherein.

Figure 1:
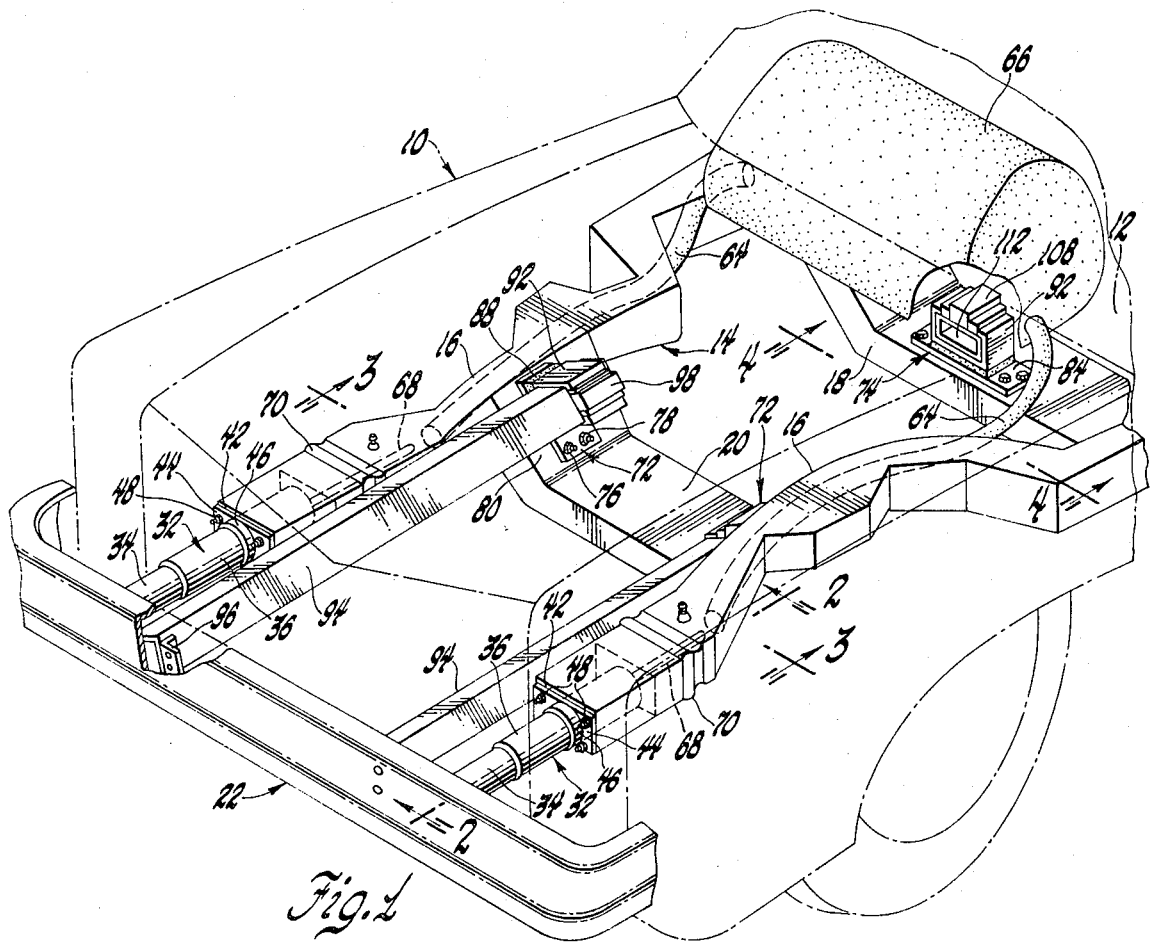
FIG. 1 is a partial perspective view of the front end of a vehicle embodying an energy absorption arrangement according to this invention.

Referring now particularly to FIG. 1 of the drawings, an automotive vehicle designated generally 10 includes an occupant compartment 12 which is provided by conventional vehicle body structure. The vehicle 10 further includes a frame 14 which includes a like pair of forwardly extending frame rails 16. The rails 16 are conventionally interconnected by a cross frame member 18 which is positioned under the toe pan of the vehicle, and a cross frame member 20 which is positioned in the engine compartment of the vehicle. The cross frame members are normally of shallow U or dish shaped cross section, with the member 18 functioning to support the transmission of the vehicle power plant and the member 20 functioning to support the engine of the vehicle power plant as will be apparent from a further description.

An impact bar or bumper 22 traverses the forward ends of the rails 16. The impact bar includes laterally spaced pairs of upper and lower reinforcements 24 and 26 respectively, FIG. 2, which are welded to the impact bar. Each pair is bolted at 28 to a U-shaped bracket 30 which is secured to the forward end of the respective like energy absorbing strut or device 32, FIG. 1. The details of the struts 32 are not shown herein since the strut is commercially available and is shown and described in detail in Jackson et al, U.S. Pat. No. 3,700,273, Energy Absorbing Bumper System, issued Oct. 24, 1972 and assigned to the assignee of this invention. Briefly, the strut 32 includes a piston assembly 34 and a cylinder assembly 36. The movement of assembly 34 within the cylinder assembly 36 under impact forces applied to bar 22 forces an apertured piston on the inner end of assembly 34 through a displaceable pressurized fluid medium contained within the cylinder assembly so that the medium flows from one side of the piston to the other and absorbs the energy of the impact forces. The cylinder assembly axially mounts a metering rod received within the aperture of the piston to provide a variable area orifice, the area of which decreases with the distance that the piston assembly moves within the cylinder assembly. When the piston assembly has moved its fullest possible extent, the piston thereof engages the rear wall 38 of the cylinder assembly and the strut reaches its limit of energy absorption capability by bottoming out. Each strut 32 is mounted in the same manner to a rail 16; accordingly, only the mounting of the left-hand strut will be described.

Figure 2:
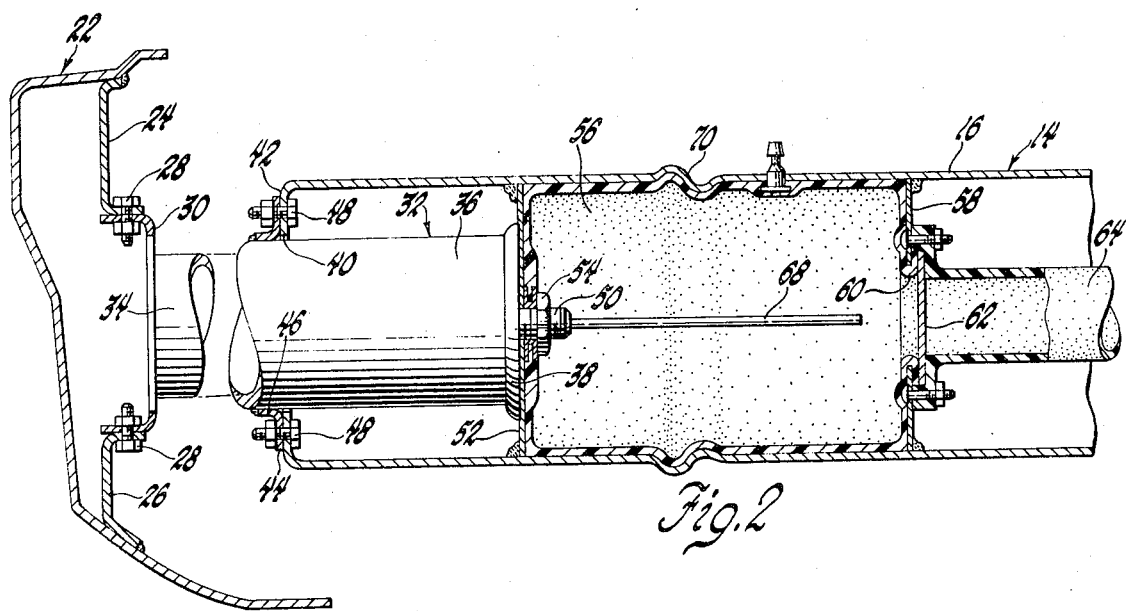
FIG. 2 is an enlarged sectional view taken generally along the plane indicated by line 2—2 of FIG. 1.

The rail 16 is generally of hollow square-like cross section as can be seen in FIG. 2 and receives the strut 32 through an aperture 40 in a forward flanged wall 42 thereof. A generally square-shaped bracket 44 overlies wall 42 and includes a central circular flange 46 which is welded to the assembly 36. The bracket 44 is bolted at 48 to the wall 42 to thereby mount an intermediate portion of the strut 32 to the frame. A threaded stud 50 extends from wall 38 of the cylinder assembly 36. The stud 50 may be formed as an extension of the aforementioned metering rod. The wall 38 of the cylinder assembly abuts against an intermediate wall 52 which is welded to the rail 16. A nut 54 secures the stud 50 and the forward wall of a flexible bladder or container 56 to wall 52. The container contains a suitable pressurized fluid medium. The container 56 is housed within the frame rail between the wall 52 and an apertured wall 58 spaced therefrom. An opening 60 in the rearward wall of the container is closed by a rupturable diaphragm 62 to normally block communication between the container and a tubular passage 64. The passage 64 extends either wholly or partially within the frame rail as shown in FIG. 1 and connects at its rearward end to an inflatable occupant restrain cushion 66 which is conventionally mounted on the instrument panel of the vehicle within the occupant compartment 12 for inflation and use by front seat occupants should the impact forces applied to the vehicle by the impact bar exceed a predetermined higher limit. A piercing rod 68 extends from the stud 50 and partially through the container 56 to rupture the diaphragm 62 as will be further described.

As shown in FIG. 2, the frame rail 16 includes one or more peripheral beads 70 in the area of the container 56 to provide for controlled deformation of the forward portions of the frame rails when the impact loads exceed a predetermined lower limit as will be described. The foregoing description of the strut, the container and the communication between the container and the cushion 66 is brief since reference may be had to copending application Ser. No. 309,499 Lindbert et al., Occupant Restraint System, filed Nov. 24, 1972, and assigned to the assignee of this invention for a detailed description.

Figure 3:
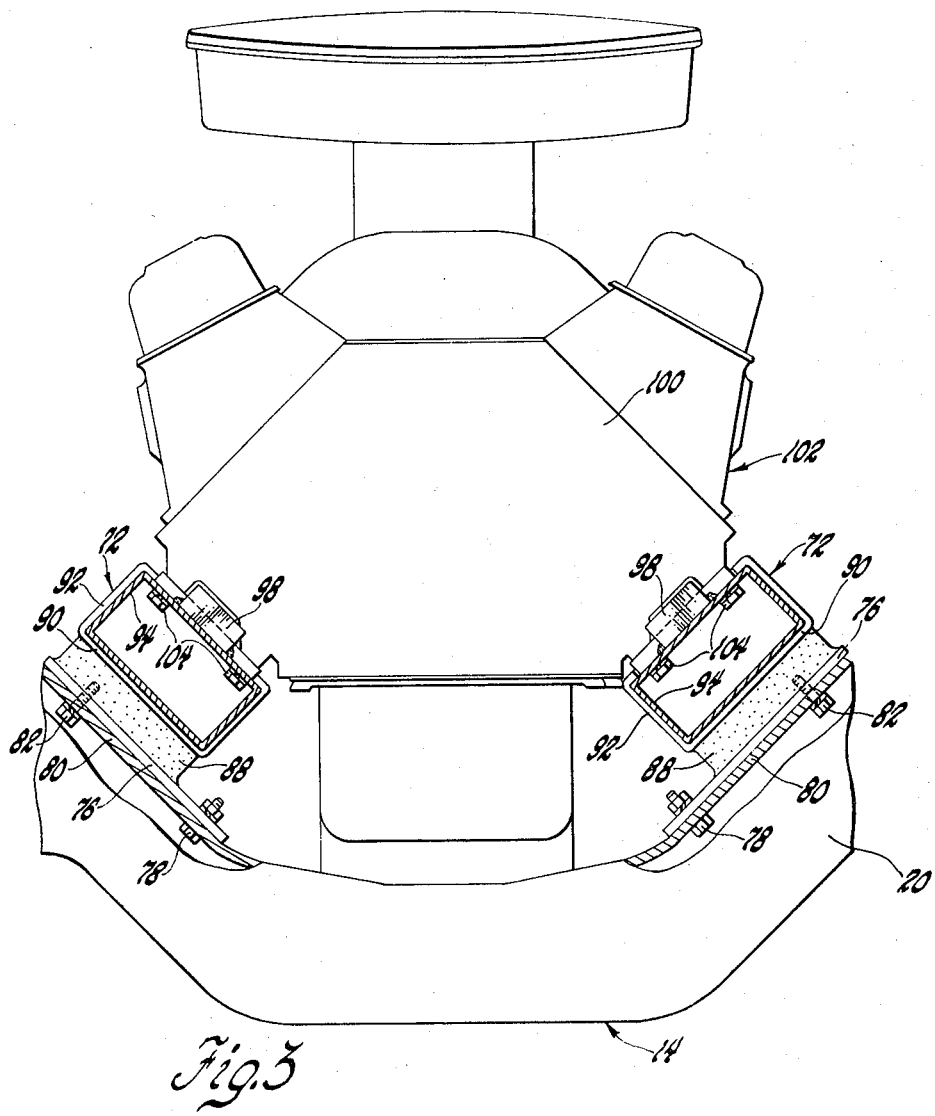
FIG. 3 is a view taken generally along the plane indicated by line 3—3 of FIG. 1.
Figure 4:
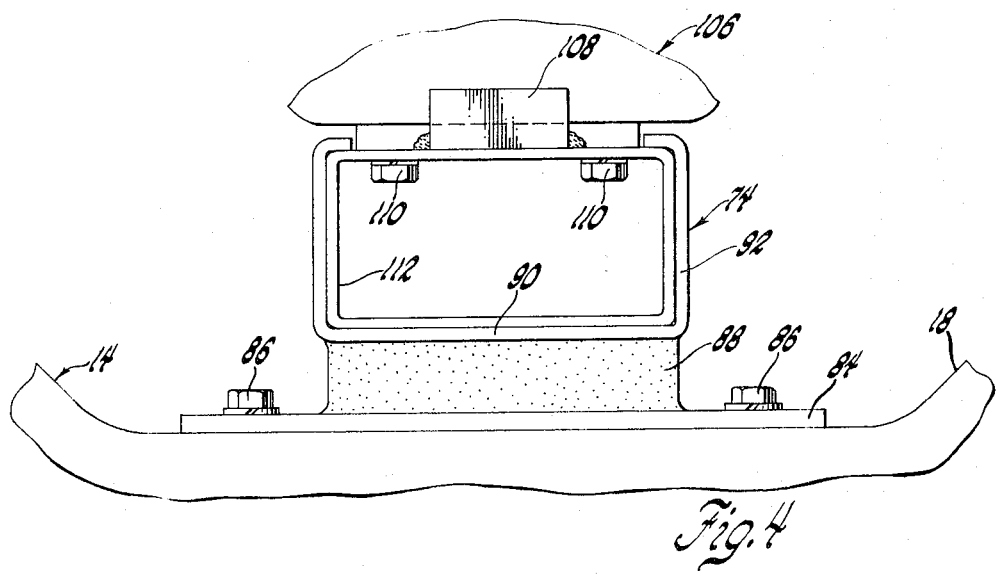
FIG. 4 is an enlarged sectional view taken generally along the plane indicated by line 4—4 of FIG. 1.

As best shown in FIG. 3, a guide 72 is provided on each of the upwardly and outwardly flaring legs of the cross frame member 20. As shown in FIG. 4, substantially the same guide 74 is provided on the base leg of the cross frame member 18. Accordingly, like numerals will be used for like parts of the guides. Each guide 72 includes a rectangular steel base plate 76 which is bolted at 78 to the upper wall 80 of a respective leg of the cross frame member 18 as shown in FIG. 4. Plate 76 is additionally secured to a respective wall 80 by bolts 82 which extend into tapped openings of the plate. The plate 84 of guide 74 is larger and is bolted at 86 to the upper wall of the base leg of cross frame member 18. A layer 88 of high durometer rubber is bonded in a conventional manner to each plate 76 and 84. The base wall 90 of a generally flattened C-shaped guide 92 is bonded to each layer 88 of rubber.

With reference now to FIG. 1 of the drawings, a hollow rigid member 94 of rectangular cross section is located adjacent each rail 16 and has its forward end welded or otherwise secured by brackets 96 to the members 24 and 26 adjacent each bracket 30. The members 94 extend rearwardly and each is slidably received within a respective guide 92 as shown in FIG. 3. With reference now to FIG. 3, members or pads 98 are welded or otherwise fixedly secured to the block 100 of the engine 102 of the vehicle power plant and are bolted at 104 to the upper wall of the members 94 to thereby secure the engine to the impact bar 22 for movement as a unit with the impact bar. Although not shown, access openings in the lower walls of the members 94 provide access so that the bolts 104 can be driven into tapped openings of the pads 98.

The transmission 106 of the vehicle power plant, as shown in FIG. 4, has likewise welded thereto a pad 108 which is the same as pad 98. Pad 108 is bolted at 110 to a rigid member 112 which is the same as the members 94 but of much shorter length. Member 112 is slidably received in guide 92.

From the foregoing description, it can be seen that the vehicle power plant including both the engine 102 and the transmission 106, is rigidly secured by the members 94 to the impact bar 22 of the vehicle for movement therewith as a unit relative to the frame 14 as the members 94 and 112 slide relative to their guides 92.

Normally when the impact bar engages a fixed obstacle, such as a rigid barrier, the forward motion of the impact bar stops in anywhere from 3 to 7 milliseconds. The impact bar is relatively light and represents only a minor part of the mass of the vehicle. The remainder and major part of the mass of the vehicle, including the body structure, the frame 14, and the power plant continue forward at their same velocity and decelerate in varying time periods up to 125 milliseconds as they crush against the barrier around the impact bar. By rigidly interconnecting the power plant of the vehicle and the impact bar, the mass of the power plant is stopped in the same 3 to 7 millisecond period and, further, no longer forms part of the mass of the remainder of the vehicle which crushes against the barrier around the impact bar. Normally, the mass of the power plant is from 700 to 800 pounds, and it is believed apparent that the deceleration rate of the vehicle is changed when this mass is stopped at the same time as the impact bar is stopped.

Should the impact forces be of lower level, then the struts 32 function to absorb such lower level impact forces and control the rate of deceleration of the vehicle relative to the impact bar and power plant. Should the forces be higher level, the beads 70 provide for controlled deformation of the forward portions of the frame rails to absorb such higher level forces. Once these forces exceed the absorption limit of the frame rails, the piercing rods 68 will, of course, engage and rupture the diaphragms 62 to permit the contents of the containers 56 to flow to the cushion 66 for inflation thereof.

Although the frame rails are shown as having mechanically deformable portions and an inflatable occupant restraint cushion is shown in conjunction with the energy absorption arrangement, it should be noted that the arrangement will function and that certain advantages will be obtained without such deformable portions of the frame and likewise without the inflatable restraint cushion.

Thus, the invention provides an improved energy absorbing arrangement for an automotive vehicle.

We claim:

1. The combination comprising, an automotive vehicle having a frame, an impact bar receptive of impact forces upon engagement thereof with an obstacle, a power plant, means rigidly connecting the power plant to the impact bar to provide a unit receiving the impact forces, and energy absorbing means operative between the unit and the frame for absorbing such impact forces.

2. The combination comprising, an automotive vehicle having a frame, an impact bar receptive of impact forces upon engagement thereof with an obstacle, a power plant, means rigidly connecting the power plant to the impact bar to provide a unit receiving the impact forces, and energy absorbing means operative between the impact bar and the frame for absorbing impact forces received by the unit.

3. The combination comprising, an automotive vehicle having a frame, an impact bar receptive of impact forces upon engagement thereof with an obstacle, means movably mounting the impact bar on the frame, a vehicle power plant, means movably supporting the power plant on the frame, means simultaneously applying the impact forces received by the impact bar to said power plant for movement thereof as a unit with the impact bar relative to the frame, and energy absorbing means operative to absorb the impact forces received by the unit.

4. The combination comprising, an automotive vehicle having a frame, an impact bar, energy absorbing means movably mounting said impact bar on said frame for absorbing impact forces received by the bar upon engagement thereof with an obstacle, a power plant, means slidably supporting the power plant on the frame, and means rigidly connecting the power plant to the impact bar to apply the impact forces received by the impact bar to the power plant for movement of the impact bar and power plant as a unit relative to the frame and absorption of the impact forces by the energy absorbing means.

5. The combination comprising, an automotive vehicle having a frame including spaced frame rails interconnected by cross frame members, an impact bar, energy absorbing means movably mounting said impact bar on said frame rails for absorbing impact forces received by the bar upon engagement thereof with an obstacle, guide means supported by said cross frame members, a power plant, guided means secured to said power plant and slidably received in said guide means to support the power plant on the cross frame members, and means rigidly connecting the power plant to the impact bar to apply the impact forces received by the impact bar to the power plant for movement of the impact bar and power plant as a unit relative to the frame and absorption of the impact forces by the energy absorbing means.

6. The combination comprising, an automotive vehicle having a frame including a controlled mechanically deformable portion capable of absorbing higher level impact forces, an inflatable occupant restraint, an impact bar receptive of impact forces upon engagement thereof with an obstacle, a power plant, means rigidly connecting the power plant to the impact bar to provide a unit receiving the impact forces, energy absorbing means operative between the unit and the frame for absorbing low level impact forces and transferring high level impact forces to the deformable portion of the frame for absorption thereby, and means inflating the restraint when the high level impact forces exceed a predetermined limit.

7. The combination comprising, an automotive vehicle having a frame including a controlled mechanically deformable portion capable of absorbing higher level impact forces, an impact bar receptive of impact forces upon engagement thereof with an obstacle, a power plant, means rigidly connecting the power plant to the impact bar to provide a unit receiving the impact forces, and energy absorbing means operative between the unit and the frame for absorbing low level impact forces and transferring high level impact forces to the deformable portion of the frame for absorption thereby.

* * * * *